(12) United States Patent
Charpentier

(10) Patent No.: US 8,284,985 B2
(45) Date of Patent: Oct. 9, 2012

(54) INTERACTIVE DEVICE FOR PROCESSING DOCUMENTS

(75) Inventor: Didier Charpentier, Aigues Mortes (FR)

(73) Assignee: Itesoft S.A., Aimargues (FR)

( * ) Notice: Subject to any disclaimer, the term of this patent is extended or adjusted under 35 U.S.C. 154(b) by 959 days.

(21) Appl. No.: 12/091,325

(22) PCT Filed: Oct. 24, 2006

(86) PCT No.: PCT/FR2006/002418
§ 371 (c)(1),
(2), (4) Date: Sep. 23, 2008

(87) PCT Pub. No.: WO2007/060303
PCT Pub. Date: May 31, 2007

(65) Prior Publication Data
US 2009/0175491 A1    Jul. 9, 2009

(30) Foreign Application Priority Data
Oct. 24, 2005   (FR) ...................................... 05 10900

(51) Int. Cl.
G06K 9/00    (2006.01)
(52) U.S. Cl. ...................................................... 382/100
(58) Field of Classification Search .................. 382/100, 382/112, 115–127, 137, 165, 218; 707/E17.019; 715/200, 700, 961; 705/1.1–6; 704/200, 704/275

See application file for complete search history.

(56) References Cited

U.S. PATENT DOCUMENTS

| 2003/0099379 A1 | 5/2003 | Monk |
| 2003/0128866 A1 | 7/2003 | McNeal |
| 2003/0154085 A1 | 8/2003 | Kelley |
| 2004/0205534 A1 | 10/2004 | Koelle |

FOREIGN PATENT DOCUMENTS

| EP | 0435478 | 7/1991 |
| GB | 2239725 | 7/1991 |

OTHER PUBLICATIONS

International Search Report for International Application No. PCT/FR2006/002418.

Primary Examiner — Atiba O Fitzpatrick
(74) Attorney, Agent, or Firm — Young & Thompson

(57) ABSTRACT

A device for processing multiple procedures based on multiple types of documents includes the functions of selecting one procedure from among multiple procedures, identifying in a database the complementary information needed to perform the procedure, and requesting complementary information from the user, adapted to ask the user for at least one piece of complementary information. The device can capture an image of a document process the image and extract information from the image.

17 Claims, 5 Drawing Sheets

INTERACTIVE DEVICE FOR PROCESSING DOCUMENTS

BACKGROUND OF THE INVENTION

1. Field of the Invention

Figure 1:
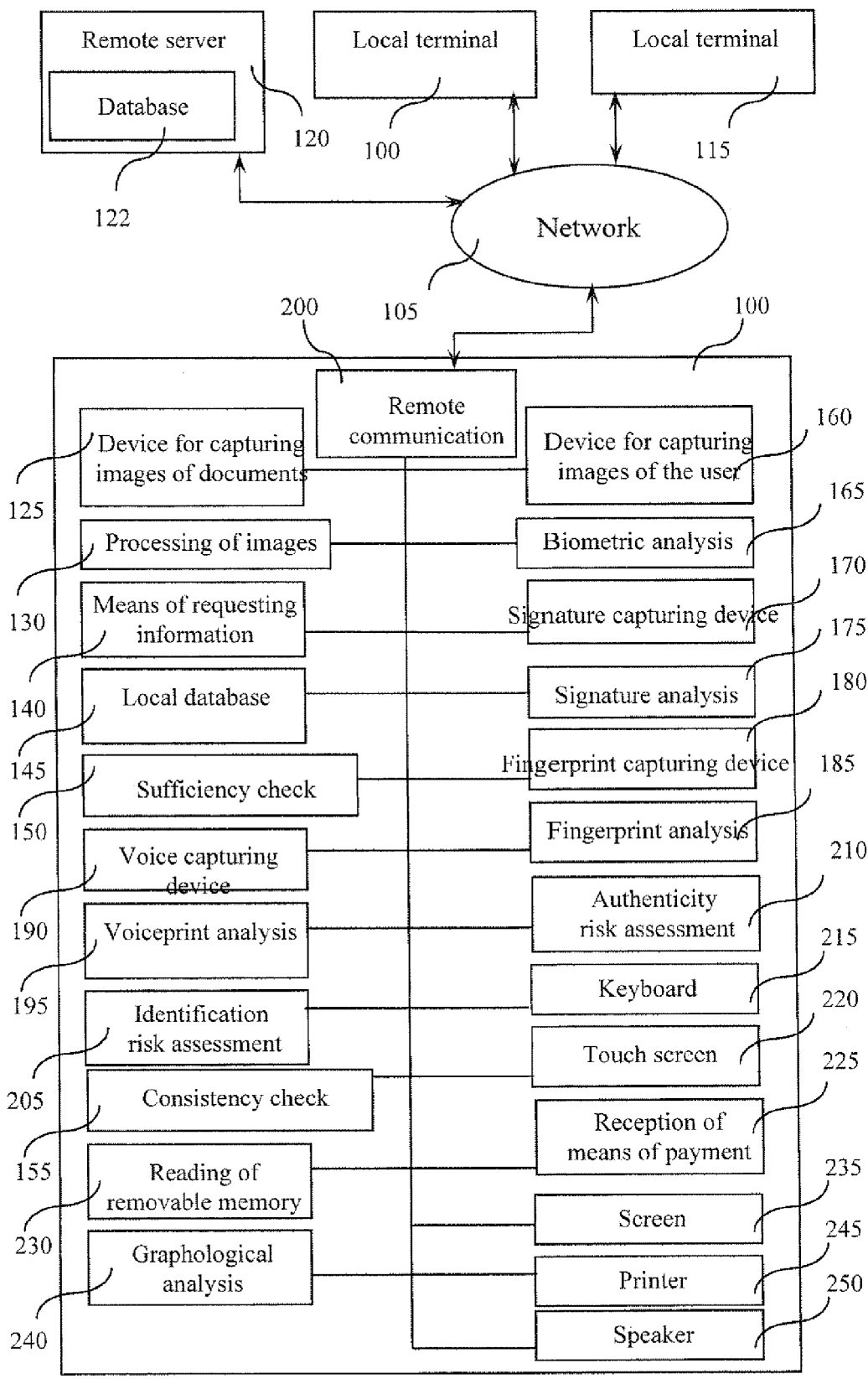

The present invention relates to a device and a process of interaction with a user. It applies, in particular, to interactive terminals capable of processing several types of procedures based on one or more documents provided by the user. On the one hand, this terminal is intended to save time for the user, and on the other hand, to enable him or her to quickly and automatically check that he or she has all the information and documents required to carry out a procedure. This terminal is also intended to save time for the organization in charge of implementing the procedure, for example by pre-processing the information and documents required for the correct execution of these procedures, estimating the risks of falsification of the user's identity or the false information or documents he or she provides, and/or collecting other information available in a database to complement or verify the information and documents provided by the user.

The objective is thus to speed up and improve relations between organizations that interact with a large number of users—for example customers, service users, visitors or members of the public—and those users.

2. Description of the Related Art

There are already in existence terminals equipped with a video camera, scanner and printer for document exchange and remote communication. While they enable dialogue between the user and a remote interlocutor known as the "hotliner" and discussion of the content of documents, they do not perform any automatic processing, and therefore do not increase the productivity of the organization.

Other interactive terminals are effectively computers that provide help, in several languages, for preparing administrative formalities. They do not enable documents to be processed. The user must then meet an employee in person to give him or her the documents needed for the procedure concerned. The increase in productivity is therefore further decreased.

There are already in existence systems for processing checks equipped with a means of optical character recognition, biometric identification and a risk analysis machine that identifies the user and authorizes, in function of the level of confidence regarding this identification, the payment of a check.

There are also already in existence systems used by immigration services that check the fingerprints of a traveler from a passport before authorizing access to the territory concerned.

The two systems described above therefore only process low-level information, and only provide binary results; that is to say authorization or refusal and, possibly, the amount of a payment.

Aside from confirmations, no information is requested from the user who passively waits for the result of the processing operations. These systems can only process a single type of documents, and therefore do not make it possible to prepare for interaction with an administrative employee.

Yet fiscal, administrative, social, and/or insurance organizations work with a large number of procedures, each of which involves a large number of forms, and written proof on paper or in electronic format.

Therefore, the need exists for interactive, multi-procedure terminals, i.e. capable of processing multiple procedures based on different types of documents.

SUMMARY OF THE INVENTION

The present invention aims to provide a solution for these disadvantages.

To that effect, a first aspect of the present invention aims at providing a device for processing multiple procedures based on multiple types of documents, which includes:
- a means of selecting one procedure from among the aforementioned multiple procedures,
- a means of identifying, in a database, the complementary information needed to perform the aforementioned procedure, and
- a means of requesting complementary information from the user, adapted to asking the user for at least one piece of complementary information identified by the means of identifying information.

By means of these mechanisms, several procedures can be handled by the same device, and the various pieces of information required for these procedures are successively requested from the user. In this way, the user can successively provide the administrative or other information necessary for a procedure, and verify that he or she satisfies the conditions for successfully completing this procedure.

The aim is to make the relations between the user and the clerks of the organization simpler, quicker and more reliable. The device makes it possible to reduce waiting times, the time spent at the counter and time spent processing documents in the back office. It also enables the employee to focus on the cases in which there is a doubt concerning the user's identity or the authenticity of the documents presented.

In function of specific characteristics, the means of selecting a procedure includes:
- a means of capturing document images,
- a means of processing the images captured by the means of capturing images, adapted to recognizing one type of document from among the aforementioned multiple types of documents, and
- a means of identifying a procedure adapted to identifying the procedure to which the aforementioned type of document corresponds.

The means of identification is adapted to identifying, in a database, the complementary information needed, in addition to the aforementioned document, to perform the aforementioned procedure.

By means of these mechanisms, the procedure(s) linked to one type of document, is (are) automatically recognized, and the information concerning it/them are automatically identified.

In function of specific characteristics, the means of identifying information is adapted to identifying complementary documents, while the means of requesting complementary information is adapted, on the one hand, to requesting at least one complementary document and, on the other hand, to commanding a means of capturing images to make it capture an image of each complementary document requested, while the means of processing the image is adapted to verifying the type of each complementary document of which an image has been captured.

By means of these mechanisms, when several documents are necessary to perform the procedure, the device requests them from the user.

In function of specific characteristics, the means of processing images is adapted to extracting information from at least one document image captured by the means of capturing images; in addition, the device includes a means of comparing the same type of information extracted from the images of different documents in order to verify how they correspond, while the means of requesting complementary information is adapted to indicating when there is no correspondence between the same type of information extracted from the images of different documents.

By means of these mechanisms, the user and/or organization can be informed about changes in their situation or inconsistencies in the declaration, so as to correct them or perform additional checks.

In function of specific characteristics, the means of requesting complementary information is adapted, on the one hand, to requesting that the user enter at least one piece of complementary information and, on the other hand, to commanding a means of manual or vocal entry of complementary information by the user.

In function of specific characteristics, the means of requesting complementary information is adapted, on the one hand, to requesting that a portable electronic information medium be presented and, on the other hand, to commanding a means of communicating with this portable electronic information medium.

In function of specific characteristics, the device as briefly described above also includes a means of searching for complementary information, from a database, adapted to searching, in a database, for at least one piece of complementary information identified by the means of identifying complementary information.

Due to the nature of each of these mechanisms, the complementary information needed can be completed, checked, and/or updated.

In function of specific characteristics, the device as briefly described above includes a means of comparing at least one piece of complementary information provided by a user in response to the request for complementary information made by the means of requesting complementary information and at least one piece of complementary information of the same type provided by the means of searching for complementary information, while the means of requesting information is adapted to indicating when there is no correspondence between at least one piece of complementary information provided by the user and one piece of complementary information of the same type provided by the means of searching for complementary information.

By means of these mechanisms, the complementary information can be checked and/or updated.

In function of specific characteristics, the means of processing images is adapted to verifying that each document of which an image has been captured by the means of capturing images includes all of the information required for the aforementioned procedure and, in the case of a lack of required information, of transmitting to the means of requesting information each of the pieces of information missing from that document.

By means of these mechanisms, the device can help users fill in documents or forms and, in particular, give them access to on-line help and/or a real or virtual tele-advisor.

In function of specific characteristics, the device as briefly described above includes an image capture device that photographs part of the user's body, and a means of biometric analysis adapted to comparing this image with an image of a photograph of the user on a document of which an image has been captured by the means of capturing images.

In function of specific characteristics, the device as briefly described above includes an image capture device that photographs part of the user's body and a means of biometric analysis adapted to comparing this image and the biometric data of the user with those stored in a remote database or local memory medium.

In function of specific characteristics, the device as briefly described above includes a means of capturing a user's handwriting or signature written on the surface of this means of capturing handwriting or signatures, and a means of analyzing handwriting or signatures adapted to comparing this handwriting or signature with an image of the user's handwriting or signature present on a document of which an image has been captured by the means of capturing images.

In function of specific characteristics, the device as briefly described above includes a means of capturing a user's handwriting or signature written on the surface of this means of capturing handwriting or signatures, and a means of analyzing the movements of the handwriting or signature adapted to comparing these movements with information about the movements of the user's handwriting or signature stored in a remote database or on a portable electronic information medium.

In function of specific characteristics, the device as briefly described above includes a voice capturing device that captures the user's voice and a means of voiceprint analysis adapted to comparing the voiceprint of the user with the user's voiceprint data stored in a remote database or local memory medium.

By means of each of these mechanisms, any risk concerning the identity of the user can be estimated.

In function of specific characteristics, the device as briefly described above includes a means of remote transmission of document images to a third-party terminal and a means of orienting the user to this third-party terminal.

By means of these mechanisms, the clerk responsible for processing the procedure can receive all the information required for processing the procedure and effectively assisting the user.

In function of specific characteristics, the device as briefly described above includes a means of assessing the risk concerning the authenticity of a document and a means of alerting the organization adapted to transmitting a remote alert in the case of a risk assessment greater than a predetermined value.

In function of specific characteristics, the device as briefly described above includes a means of assessing the risk concerning the identification of the user and a means of alerting the organization adapted to transmitting a remote alert in the case of a risk assessment greater than a predetermined value.

In function of specific characteristics, the device as briefly described above includes a means of analyzing the physical behavior of the user.

By means of each of these mechanisms, only the procedures for which a sufficiently high risk was detected are subjected to a specific processing operation aimed at reducing and/or eliminating that risk.

In function of specific characteristics, the device as briefly described above includes a means of communication with a tele-advisor and a means of transmission, to that tele-advisor, of the information provided by the user.

By means of these mechanisms, the tele-advisor can be aware of all the documents and information provided by provided by the user, and thus help him or her more effectively.

In function of specific characteristics, the device as briefly described above includes a means of generating a virtual assistant, a means of displaying a synthesized image of that virtual assistant and a means of diffusing a synthesized voice of that virtual assistant.

By means of these mechanisms, the user can be in a more human environment for the process of providing complementary documents or information.

In function of specific characteristics, the means of processing images is adapted to verifying that the document includes all the information required for a procedure and, in the case of a lack of required information, of transmitting, to the means of requesting information, each of the pieces of information missing from that document.

By means of these mechanisms, if a user has not correctly filled out and/or signed a form, the device indicates the information missing, which enables time to be saved by the user and perhaps by the employee who would have to examine the document in question.

In function of specific characteristics, the device as briefly described above includes a means of checking that the user possesses all the information required for a procedure and, in the case of a lack of required information, of transmitting to a remote database a query pertaining to at least one piece of missing information.

By means of these mechanisms, if a document or piece of information is missing, for example a proof of residence, the device checks whether such a proof of residence has already been recorded in a database, which enables time to be saved by the user.

A second aspect of the present invention aims at providing a process for processing multiple procedures based on multiple types of documents, characterized by including:
  a selection step for choosing one procedure from among the aforementioned multiple procedures,
  an identification step for identifying, in a database, the complementary information needed to perform the aforementioned procedure and
  a complementary information request step for requesting complementary information from the user, adapted to asking the user for at least one piece of complementary information identified by the means of identifying information. In function of specific characteristics, the selection step includes:
  a document image capture step,
  an image processing step for processing the images captured by the means of capturing images, adapted to recognizing one type of document from among the aforementioned multiple types of documents, and
  a procedure identification step adapted to identifying the procedure to which the aforementioned type of document corresponds,
the identification step identifying, in a database, the complementary information needed, in addition to the aforementioned document, to perform the aforementioned procedure.
  In function of specific characteristics:
  during the information identification step, the documents complementary to the aforementioned document are identified,
  during the complementary information request step, on the one hand, at least one complementary document is requested and, on the other hand, an image capture step is triggered for capturing an image of each complete document requested, and
  during the image processing step, the type of each complementary document of which an image has been captured is verified.

The advantages, aims and specific characteristics of this process being similar to those of the interactive terminal as briefly described above, they are not re-described here.

A third aspect of the present invention aims at pre-processing user requests before meeting an advisor or for replacing this meeting by an advisor, after identification of the user.

To this effect, this third aspect of the present invention aims to provide an interaction device for interactions between a user and an organization, characterized by including:
  a means of identifying the user and
  a means of putting the user in auditory communication with a representative of the organization.

By means of these mechanisms, the representative of the organization, or tele-advisor, can verify that the user is really the person he or she claims to be, access confidential information about the user, for example his or her file within the organization concerned, and share this information confidential information with the user. The user and the tele-advisor can thus perform the interactions required for setting up a procedure or transaction.

The user can successively provide the information required for an administrative, transactional or other procedure, and verify that he or she satisfies the conditions for successfully completing that procedure.

The aim is to make the relations between the user and the organization simpler, quicker and more reliable. The device makes it possible to reduce waiting times, the time spent interacting with the tele-advisor and the time spent processing procedures in the back office.

In function of specific characteristics, the means of identifying the user includes an image capture device that photographs part of the user's body and a means of biometric analysis adapted to comparing this image with the biometric user data stored in a remote database or local memory medium.

In function of specific characteristics, the means of identifying the user includes a means of capturing a signature, signed by the user on that means of capturing a signature, and a means of signature analysis adapted to comparing that signature with the user signature data stored in a remote database or local memory medium.

In function of specific characteristics, the means of identifying the user includes a means of capturing handwriting, written by the user on that means of capturing handwriting, and a means of handwriting analysis adapted to comparing that handwriting with the user handwriting data stored in a remote database or local memory medium.

In function of specific characteristics, the means of identifying the user includes a device for capturing fingerprints that captures the user's fingerprints and a means of fingerprint analysis adapted to comparing that fingerprint with the user fingerprint data stored in a remote database or local memory medium.

In function of specific characteristics, the means of identifying the user includes a voice capturing device that captures the user's voiceprint and a means of voiceprint analysis adapted to comparing this voiceprint with the user voiceprint data stored in a remote database or local memory medium.

In function of specific characteristics, the means of identifying the user includes a means of assessing the risk concerning the identification of the user and a means of alerting the organization adapted to transmitting a remote alert in the case of a risk assessment greater than a predetermined value.

In function of specific characteristics, the means of identifying the user includes a means of checking that the user possesses all the information required for a procedure and, in the case of a lack of required information, of transmitting to a remote database or local memory medium a query pertaining to at least one piece of missing information.

In function of specific characteristics, the means of identifying the user includes a voice capturing device that captures the user's voiceprint and a means of voice recognition adapted to recognizing the words spoken by the user.

In function of specific characteristics, the means of identifying the user includes a means of capturing the user's handwriting adapted to recognizing the symbols and/or words written by the user on an interface of that means of capturing handwriting.

In function of specific characteristics, the device as briefly described above includes a means of requesting complementary information from a remote database or local memory medium.

By means of these mechanisms if a piece of information is missing, for example a proof of residence, the device checks whether such a piece of information has already been recorded in a database or local memory medium, which enables time to be saved by the user.

In function of specific characteristics, the device as briefly described above includes a means of transmitting information entered by the user or the representative of the organization, or received from a remote database or local memory medium, to a third-party terminal and a means of orienting the user to that third-party terminal.

In function of specific characteristics, the device as briefly described above includes a means of transferring user identification data to a remote database or local memory medium.

In function of specific characteristics, the device as briefly described above includes a means of analyzing the behavior of the user.

In function of specific characteristics, the device as briefly described above includes a means of generating a virtual assistant, a means of displaying a synthesized image of that virtual assistant and a means of diffusing a synthesized voice of that virtual assistant.

In function of specific characteristics, the device as briefly described above includes a means of recognizing natural language adapted to processing the natural language, whether written or spoken, used by the user during an interaction with that device.

A fourth aspect of the present invention aims at improving the detection of risks of identity or document falsification.

To this effect, this fourth aspect of the present invention aims to provide an interaction device for interactions between a user and an organization, characterized by including:
a means of analyzing the user's behavior and
a means of evaluating risk in function of the analysis of the user's behavior.

In function of specific characteristics, the means of analyzing the user's behavior is adapted to processing changes in behavior in response to questions or requests provided by the device.

In function of specific characteristics, the means of analyzing behavior is adapted to estimating any physical agitation of at least one part of the user's body and determining the evolution of this physical agitation.

By means of each of these mechanisms, it can be determined whether questions or requests make the user uncomfortable.

BRIEF DESCRIPTION OF THE DRAWING FIGURES

Figure 2A:
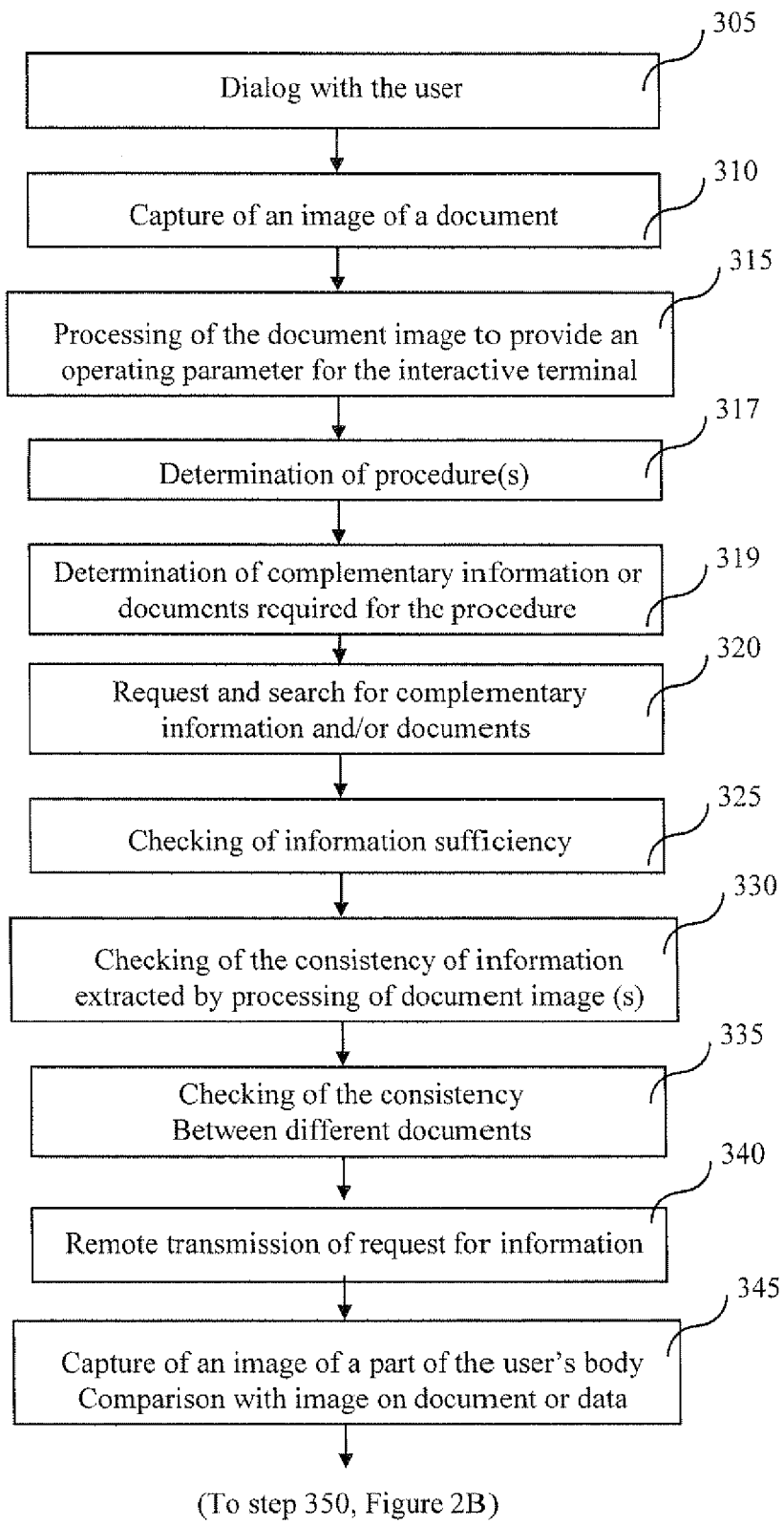
Figure 2B:
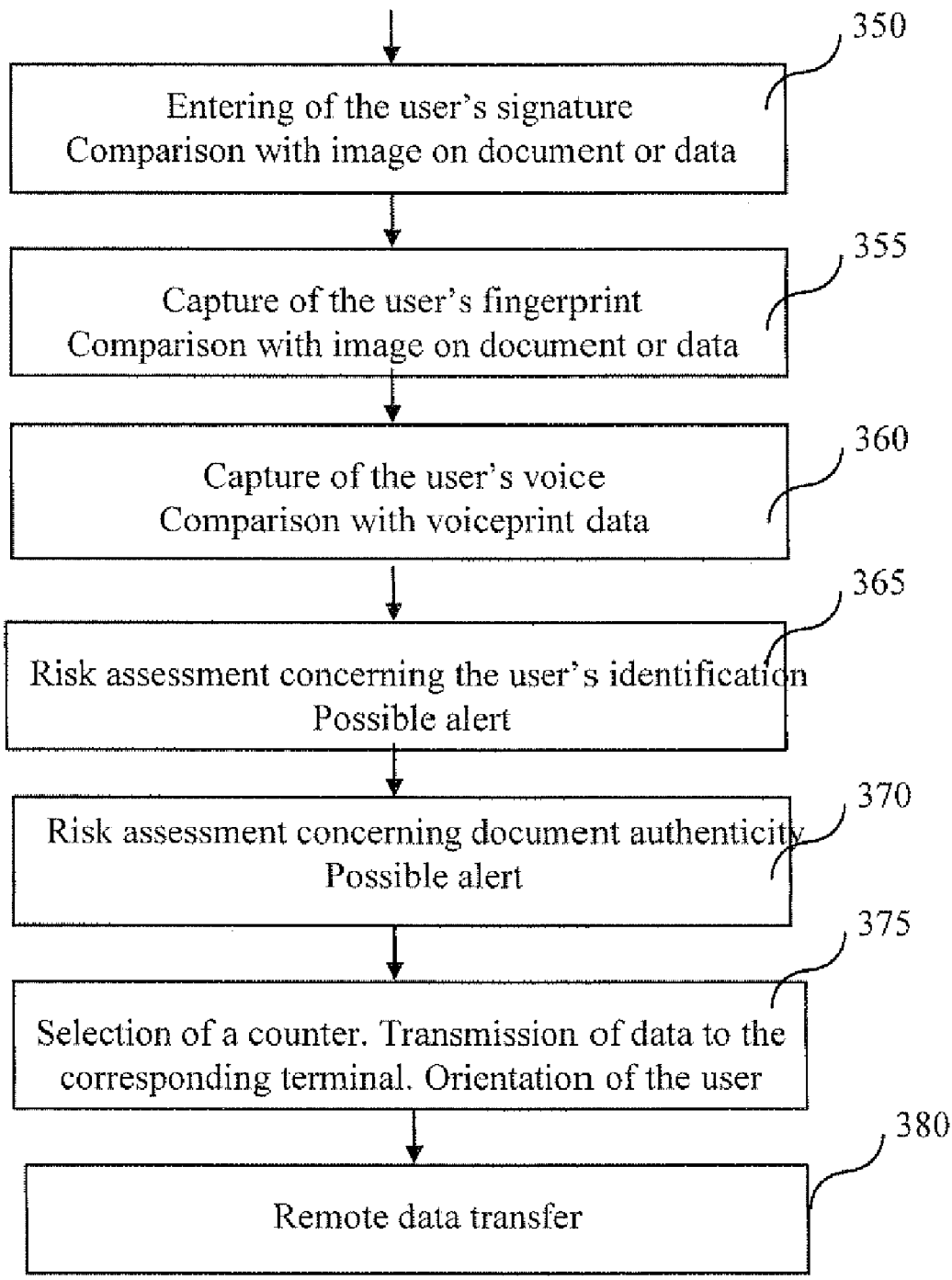
Figure 3:
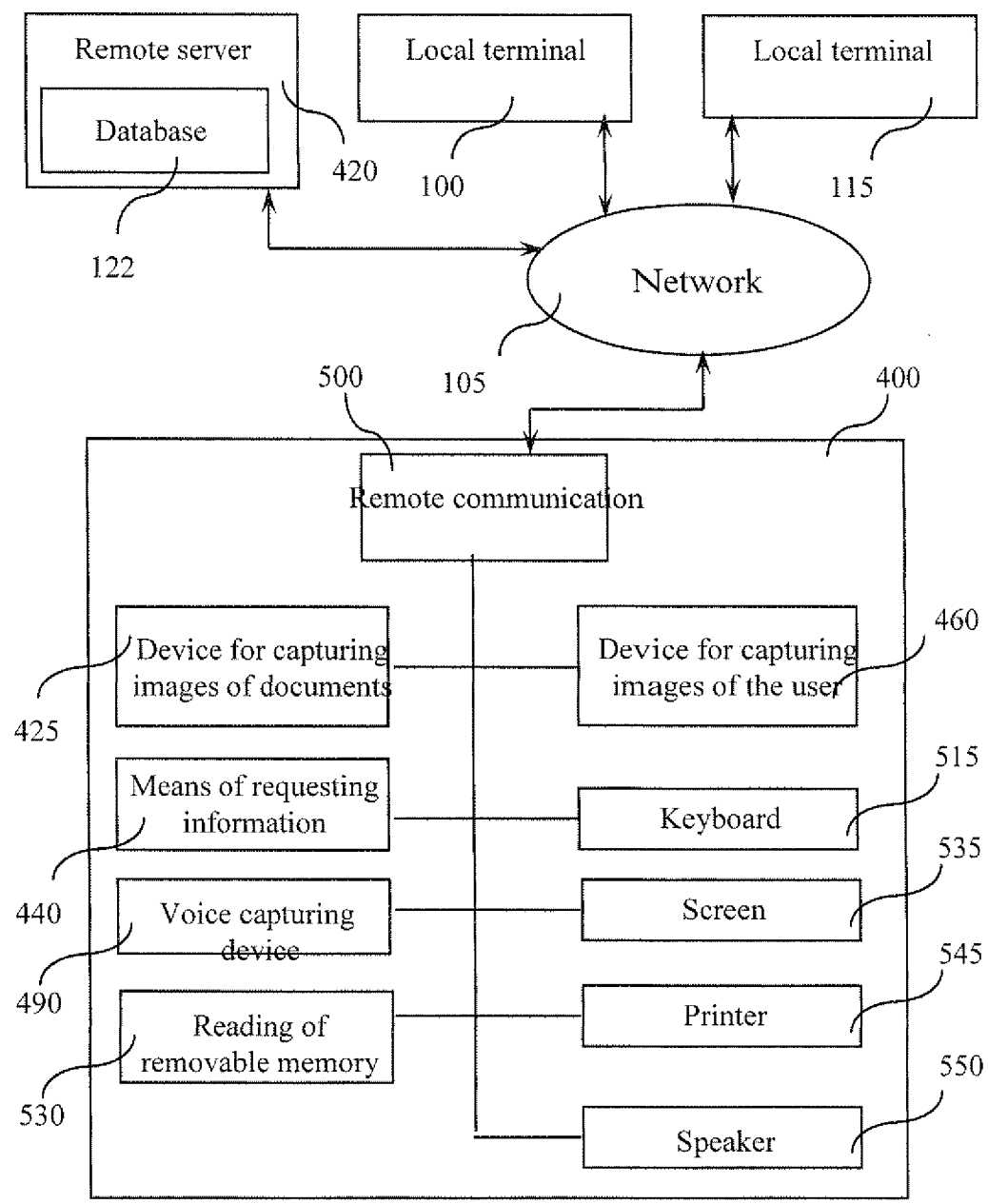
Figure 4:
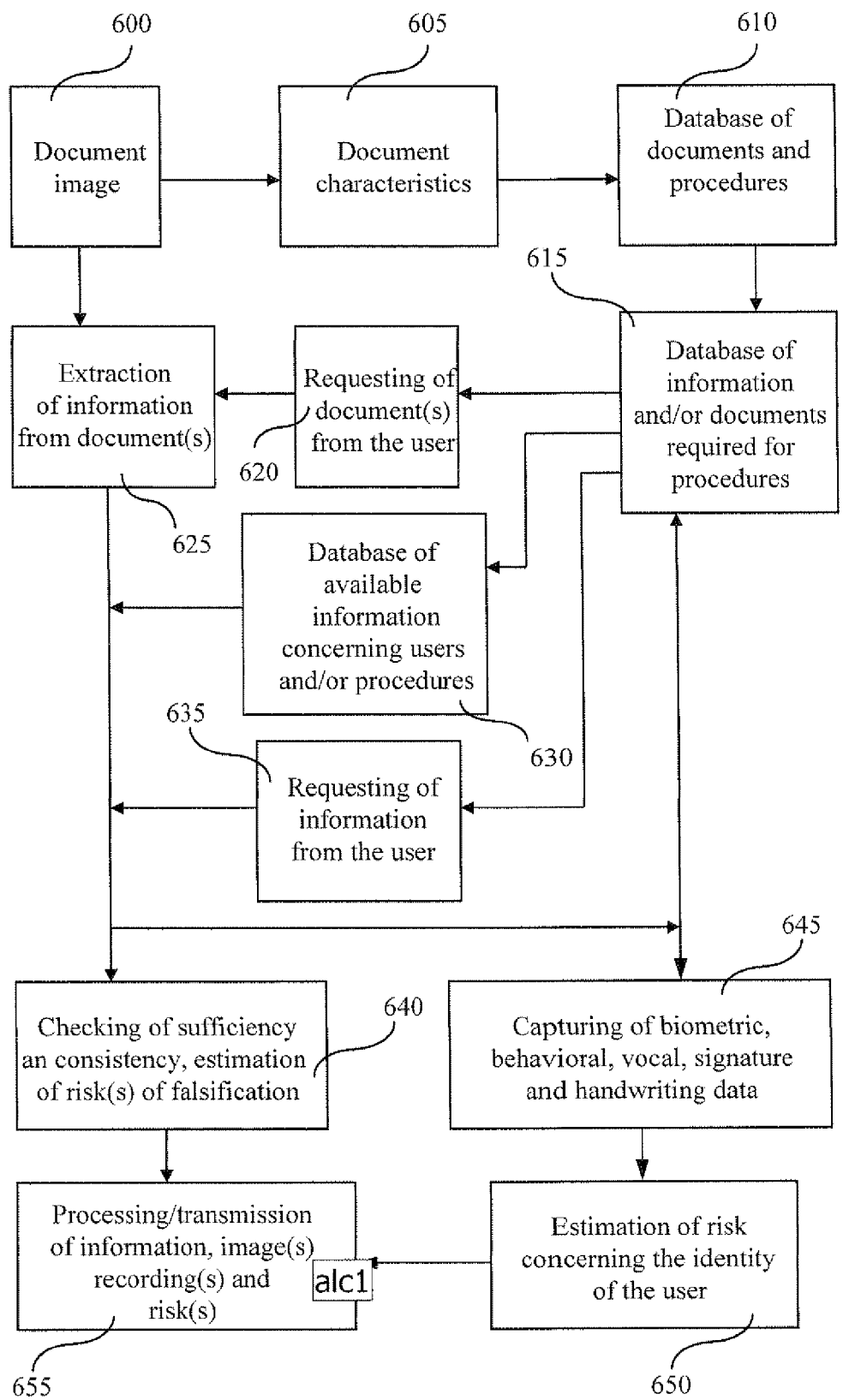

Other advantages, aims and characteristics of the present invention will emerge from the following description, whose aim is explicative and in no way restrictive with regard to the attached diagram, in which:

FIG. 1 represents, in the form of a functional diagram, a specific way of setting up the interaction device covered by the present invention including an interactive terminal, FIGS. 2A and 2B represent, in the form of a logigram, a series of steps implemented in a specific way of setting up the process covered by the present invention, FIG. 3 represents, in the form of a functional diagram, a specific way of setting up the device covered by the present invention including a workstation, and FIG. 4 represents, in the form of a functional block diagram, functions successively implemented in a specific way of setting up the process and device covered by the present invention.

DETAILED DESCRIPTION OF THE INVENTION

Throughout the description, "type of document", refers to a characterization of the significance of documents, for example a driving license, passport, income declaration or insurance statement, or several documents belonging to the same type of document. Throughout the description, "type of information" refers to a characterization of the significance of information, for example surname, first name, address or social security number. Throughout the description, the term "document" designates documents in physical format presenting information that is visible and/or legible to the naked eye and sources or computer images of such documents. In particular, this means unstructured or slightly structured documents, unlike source codes, compiled codes or database codes, i.e. documents where the significance of the information requires processing, for example image processing.

FIG. 1 shows an interactive terminal 100 linked, by means of a computer network 105, to local terminals 110 and 115 and a remote server 120 containing a remote database 122. The interactive terminal 100 includes:
- a means of capturing images of documents 125,
- a means of processing images 130 proceeding from the means of capturing images 125, adapted to extracting the operating parameters of those images,
- a means of requesting complementary information 140,
- a local database 145,
- a means of checking 150 that the user possesses all the information required for a procedure,
- a means of checking the consistency 155 between the different pieces of information extracted by the aforementioned means of processing images 130,
- an image capture device for capturing a part of the user's body 160,
- a means of biometric analysis 165,
- a means of capturing a signature 170,
- a means of signature analysis 175,
- a device for capturing the user's fingerprints 180,
- a means of analyzing fingerprints 185,
- a device for capturing the user's voice 190,
- a means of voiceprint analysis 195,
- a means of remote communication 200,
- a means of risk assessment 205 concerning the identification of the user,
- a means of risk assessment 210 concerning the authenticity of a document,
- a keyboard 215,
- a touch screen 220,
- a means of receiving means of payment 225,
- a means of reading removable memory devices 230,
- a screen 235,
- a means of analyzing graphological characteristics 240,
- a printer 245 and
- a speaker 250.

The interactive terminal 100 takes the form of a piece of metallic furniture and includes a computer of known type, for example a PC (personal computer) linked, by means of interfaces of known type, to the keyboard 215, touch screen 220, computer network 105, means of capturing document images 125, device for capturing images of a part of the user's body 160, means of capturing a signature 170, device for capturing the user's fingerprints 180, device for capturing the user's voice 190, means of receiving means of payment 225, means of reading removable memory 230, and screen 235.

In a manner known per se, the computer includes a central processing unit, a mass memory unit, for example a hard disk, containing the local database 145 and the software applications implementing the various functions of the interactive terminal 100.

The keyboard 215 is of known type. The touch screen 220 is superimposed on the screen 235, in a manner known per se. In a first variant, the keyboard 215 is replaced or complemented by a handwriting recognition software application implemented using the touch screen 220 or a touch-screen tablet (not represented). In a second variant, the keyboard 215 is replaced or complemented by a voice recognition software application associated to the device for capturing the user's voice 190 so that the user can interact verbally with the terminal. Preferably, the keyboard 215 and/or the means of replacing or complementing the keyboard indicated in these variants are associated to a software application adapted to processing requests expressed in natural language, whether written or spoken. The computer network 105 is, for example, the Internet, a local network or an intranet. It enables data to be transmitted between the interactive terminal 100, the local terminals 110 and 115 and the remote server 120, according to known communication protocols.

The means of capturing document images 125 is, for example, a scanner of known type, preferably flatbed, i.e. including a glass plate on which the user places the document of which an image must be captured, or a scrolling scanner which passes a document in front of a linear image capturing device if only one side of the document must be analyzed, of between two linear image capturing devices if both sides of a document must be processed together.

The device for capturing a part of the user's body 160 is an electronic camera containing a matrix based image capturing device, for example of CCD type (charge coupled device), possibly complemented by a light source. The device for capturing images 160 is, for example, adapted to capturing one or more images of the whole of the user's body, the user's face, his or her iris, or one of the user's hands placed against a light background. As a variant, two cameras are implemented. For example, these two cameras can be used to perform three dimensional face recognition, using known techniques, for selecting which of the images present the best quality regarding the image processing considered (the quality being defined upstream in terms of contrast, lighting, reflection or background, for example, or downstream from the results of the processing operations obtained), or to capture images of two different parts of the user's body (for example the face and a hand placed on a part of the device).

The means of capturing a signature 170 consists, for example, of a stylus that the user uses to write a signature on the touch screen 220 or on a dedicated touch screen, smaller in size. The means of signature capture provides the computer, at each instant during the writing of the signature, with the position of the tip of the stylus and, possibly, the pressure on the touch screen, determined in function of the number of points on the touch screen affected by the pressure of the stylus tip or by a pressure sensor incorporated into the stylus.

The device for capturing the user's fingerprints 180 is of known type, for example with a glass plate on which the user presses the finger required and with a camera to capture the image of the fingerprint through that glass plate.

The device for capturing the user's voice 190 is a microphone of known type. The means of receiving means of payment 225 is of known type, for example containing a bank card reader for microchip and/or magnetic stripe bank cards, a banknote and/or coin receiver or a check receiver. The means of reading removable memory 230 is adapted to reading a removable memory, for example a microchip card (smartcard), a "USB key", i.e. a device including a memory and an interface that can be plugged into a corresponding interface of the terminal 100, or an "SD" card or memory stick, a compact disk.

The means of processing images 130 proceeding from the means of capturing images 125 is adapted to providing, from the captured image, data representative of the type of document whose image was provided. To this effect, the means of processing images 130 detects the graphic elements that characterize the document, for example vertical or horizontal lines, bar codes and/or written words identifying the document, and compares these characteristics with those, stored in the local database 145, of all the types of documents learned during a learning phase or explicitly defined in a database. An example of a process that could be implemented by the means of processing images 130 is described in document FR 01 07012, filed May 25, 2001, incorporated here for reference.

The means of processing images 130 also provides data representative of the zones of the document in which the user has written and, preferably, of the significance of what has been written. It implements known techniques, for example optical character recognition (OCR).

In the case of a document including a photograph of the user, for example an identity card, the means of processing images 130 detects this photograph (by analysis of grayscale or color levels and/or the gradients of these levels, which are generally locally lower than on the rest of the document), extracts it and stores it in a specific memory space.

In the case of a document including the user's signature, for example an identity card or application form, the means of processing images 130 detects this signature (by analysis of oblique lines, intersections of lines and/or escribed geometric forms, these elements being indicators of a signature), extracts it and stores it in a specific memory space.

From these data, the means of processing images 130 extracts at least one operating parameter and provides the user with information representative of data to be requested, in addition to the document.

To this effect, the means of processing images 130 implements a database of procedures which, for each type of document, indicates the zones of the document that must be filled out, the complementary documents required, whether or not it is necessary to identify the user, and whether or not it is necessary for the user to make a payment The means of requesting complementary information 140 consists of the screen 235 and, possibly, the speaker 250 associated to a voice synthesis software application. It is adapted to indicating to the user the information and documents required for carrying out the procedure identified by the means of processing images (if there are several possible procedures, in function of the document, the means of requesting information asks the user which one he or she wishes to perform, if that question has not already been asked prior to the capture of the image of the document, and the user selects the chosen procedure from a menu).

The local database 145 stores information required for the operating of the interactive terminal 100, in particular the lists of documents and information required for procedures and graphic data characteristic of documents.

The means of checking the consistency 155 between the different pieces of information extracted by the means of processing images 130 is adapted to verify that the significations of the words written by the user in the same document, in several documents or with respect to complementary information collected from the user or from databases, are consistent. This consistency check consists, for example, of comparing information of the same type, i.e. information whose identifier (for example surname, first name, address or social security number) is identical. Therefore, the words written in the fields corresponding to the same pieces of information are consistent if they are identical. In the same way, signatures can be compared, for example by analyzing the positions where lines cross and the distribution of ink between different zones (for example four quadrants of a rectangle ascribing the signature).

The consistency check carried out by the means of checking consistency 155 extends to checking the consistency between the contents of the documents scanned and those of the documents concerning the same user stored in a remote database or local memory medium. For example, an allowance request could be considered as inconsistent with a high income declaration. Possibly, the consistency check can be carried out with respect to threshold values corresponding to alert criteria of other organizations. For example, a credit request that exceeds legal threshold values concerning reimbursement capacity can trigger a local or remote alert, even if the user has not declared all his or her current debts.

The means of biometric analysis is adapted to extracting biometric characteristics from the image of a part of the user's body and comparing them with characteristics extracted from a photograph of which an image has been captured by the means of capturing images of a document or from a remote database stored on the remote server 120 or a local memory medium (microchip, USB key, smart card, etc.)

As a variant, the means of biometric analysis 165 can analyze the user's behavior, posture and/or the changes of expression on his or her face. The means of biometric analysis is thus a means of analyzing the user's behavior, preferably adapted to processing changes in behavior in response to questions or requests provided by the device. Preferably, this means of analyzing behavior is adapted to estimating any physical agitation of at least one part of the user's body (hand, foot, leg, face, mouth, eyes, whole body), for example the amplitude, speed and/or frequency of movements, and determining the evolution of this physical agitation. It can thus be determined whether questions or requests make the user uncomfortable.

The means of signature analysis 175 is adapted to extracting characteristics of the writing process (position, speed and/or pressure on the touch screen) of a signature written by the user with the means of capturing a signature 170 and comparing them with characteristics extracted from a signature of which an image has been captured by the means of capturing images of a document or from a remote database stored on the remote server 120 or a local memory medium (microchip, USB key, smart card, etc.)

As a variant, the means of signature analysis can, in the same way, analyze the user's cursive handwriting. The user's handwriting is thus used to identify the user either by reference to characteristics extracted from the handwriting on the analyzed documents or from a remote database stored on the remote server or a local memory medium.

The means of fingerprint analysis 185 is adapted to extracting characteristics of the user's fingerprint from a device for capturing the user's fingerprints 180 and comparing them with characteristics extracted from a fingerprint of which an image has been captured by the means of capturing images of a document or from a remote database stored on the remote server 120 or a local memory medium (microchip, USB key, smart card, etc.)

The means of voiceprint analysis 195 is adapted to extracting characteristics of the user's voice from a voice capturing device 190 and comparing them with corresponding characteristics from a remote database stored on the remote server 120 or a local memory medium (microchip, USB key, smart card, etc.)

As a variant, the means of voiceprint analysis 195 analyzes voice changes in response to questions asked by a virtual or real assistant in order to detect indicators of doubt or lying.

Using the means of remote communication 200, for example a modem, the interactive terminal provides the remote server with the user's identification characteristics determined by the means of analysis. The terminal can also record or transmit to the server all or part of what was captured during the transaction with the user, including the documents, images and sounds captured, for:

archiving and proof if required, real-time or post-session analysis by an operator, who can detect strange behavior, automatic analysis by the machine, which can detect "abnormal" behavior.

At any time, the user can request assistance using the user interface of the interactive terminal, for example by pressing a dedicated key or by a verbal request. In this case, the interactive terminal first displays a virtual assistant with a synthesized face which articulates the verbal messages transmitted by the speaker. If the user is not satisfied with this assistance, by way of the means of remote communication, the interactive terminal connects the user to a real remote assistant. This communication includes the transmission of all the images of documents that the user has provided together with his or her responses to the questions asked by the interactive terminal. The communication with the real assistant is both verbal and visual, each interlocutor seeing the image and hearing the voice of the other interlocutor.

Once all the required checks and exchanges of questions and answers have been carried out, in function of predetermined criteria, for example the specialized capacities or languages of the employees, the interactive terminal 100 orients the user to one of the local terminals 110 and 115, prints a ticket including the user sequence number for the counter concerned and, in parallel, transmits all the captured information to this terminal in order that the employee possesses all the information necessary for his or her work, before the user even arrives.

The means of analysis of graphological characteristics 240 is adapted to analyzing the graphological characteristics of what has been hand-written on the document(s) whose images have been captured by the means of capturing images of documents 125 in order to measure the consistency of the handwriting used.

In the terminal 100 or, as a variant, in a local terminal or the remote server, the means of risk assessment 205 concerning the identification of the user and the means of risk assessment 210 concerning the authenticity of a document provide an estimation of these risks, in function of the data captured by the terminal 100 or analyses carried out by the terminal 100. If one of these risks is higher than a predetermined value corresponding to that risk, an alert is transmitted to the local terminal in question, for example in the form of a display zone highlighted in red.

For example, the means of risk assessment 205 concerning the identification of the user measures the discrepancies between the biometric characteristics, signature characteristics, fingerprint and/or voiceprint captured by the interactive terminal 100 and the equivalent characteristics coming from documents, the remote database or a local memory medium (microchip, USB key, smart card etc.), weights them in function of the reliability of each of these analyses (for example fingerprint analysis, which is currently considered to be very reliable, is given a higher weighting than signature analysis, which is considered to be less reliable) and determines a global risk assessment, for example the barycenter of the normalized differences with their respective weightings.

For example, the means of risk assessment 210 concerning document authenticity measures the discrepancies between the background colors of the document (to detect local scratching) and the discrepancies between the graphological characteristics of what has been written by the user, measured by the means of analyzing graphological characteristics 240. As a variant, the user's handwriting can be used to authenticate the documents, by comparing graphological characteristics of the handwriting on the documents with corresponding graphological characteristics stored in a remote database or local memory medium.

FIG. 2A shows a dialog step 305 with the user, for example implementing a graphic interface, touch screen, touch-screen tablet, handwriting recognition software application and voice recognition software application combined with the device for capturing the user's voice. Preferably, during the step 305, the system processes requests expressed in natural language, whether written or spoken.

During this dialog step 305, the user designates a procedure that he or she wishes to carry out.

Then, during step 310, the user places a document in a means of capturing images, for example a scanner, and the scanner provides a digital image of the document.

During step 315, the image of the document is processed to provide at least one document characteristic enabling it to be identified. During the processing step 315, the system also checks that the document of which an image has already been captured includes all the information required for a procedure and, in the case of a lack of required information, defines an information request for each of the pieces of information missing from that document. Thus, if a user has not correctly filled out and/or signed a form, the system defines an information request for the missing information.

Then, during step 317, the system determines the type of document from among multiple types of documents and identifies a procedure corresponding to the type of document recognized. Then, during step 319, the system searches a database for the complementary information or documents, together with the document of which an image has already been captured, required for carrying out the procedure and defines at least one information request to be transmitted to the user concerning at least one part of the complementary information required.

It can be observed, as shown in FIG. 4, that at least one other request for complementary information required for carrying out the procedure can be transmitted to a database linked to the procedures and/or users.

During step 320, the interactive terminal requests the complementary information from the user, the complementary information requested depending on at least one operating parameter extracted during processing step 315.

During step 325, the interactive terminal checks that the user possesses all the information required for a procedure and, in the case of a lack of required information, transmits to a remote database or local memory medium (microchip, USB key, smart card, etc.) a query pertaining to at least one piece of missing information. This check can be carried out by analyzing documents of which an image has been captured and/or by questions asked and answers given by way of the user interface of the interactive terminal. Possibly, other documents are requested from the user and the system returns to step 310.

During step 330, the interactive terminal checks the consistency of the information extracted during the image processing step 315.

In the case where several documents are provided by the user, during step 335, the interactive terminal checks the consistency of the information extracted from several documents during several image processing steps 315.

The consistency check carried out during steps 330 and 335 extends to checking the consistency between the contents of the documents scanned and those of the documents concerning the same user stored in a remote database or local memory medium. Possibly, the consistency check can be carried out with respect to threshold values corresponding to alert criteria of other organizations.

During step 340, the interactive terminal transmits a complementary information request to a remote database or local memory medium (microchip, USB key, smart card, etc.), the complementary information requested depending on at least one operating parameter extracted by the means of processing images.

During step 345, the interactive terminal acquires an image of part of the user's body and analyzes this image using biometric techniques in order to compare that image with an image of a photograph of the user on an identity card captured during step 310. If no such photograph has been provided by the user, or in addition to the analysis of that photograph, the interactive terminal compares the image of the user with biometric data concerning the user stored in a remote database or local memory medium (microchip, USB key, smart card, etc.)

During step 350 (FIG. 2B), the interactive terminal requests the user to write his or her signature on the touch screen using a stylus, the touch screen provides a series of positions of the tip of the stylus together with, optionally, an indication of the pressure exerted by the stylus, and the terminal compares the thus reconstituted signature with an image of a signature on an identity card captured during step 310. If no image of a signature photograph has been provided on a document, or in addition to the initial analysis, the interactive terminal compares the reconstituted signature with data concerning the user's signature stored in a remote database or local memory medium (microchip, USB key, smart card, etc.)

As a variant, the signature analysis can be complemented or replaced by analysis of the user's cursive handwriting. The user's handwriting is thus used to identify the user either by reference to characteristics extracted from the handwriting on the analyzed documents or from a remote database stored on the remote server or a local memory medium.

During step 355, the interactive terminal acquires the user's fingerprint and analyzes this fingerprint by comparison with an image of the user's fingerprint on an identity card captured during step 310. If no fingerprint has been provided on a document, or in addition to this analysis, the interactive terminal analyzes the fingerprint by comparison with data concerning the user's fingerprint stored in a remote database or local memory medium (microchip, USB key, smart card, etc.)

During step 360, the interactive terminal captures the user's voice and analyzes a voiceprint of the user by comparison with data concerning the user's voiceprint stored in a remote database or local memory medium (microchip, USB key, smart card, etc.)

During step 365, the interactive terminal carries out a risk assessment concerning the identification of the user and, in the case where this risk is higher than a predetermined value, transmits a remote alert.

During step 370, the interactive terminal carries out a risk assessment concerning the authenticity of a document and, in the case where this risk is higher than a predetermined value, transmits a remote alert. During step 375, in function of the procedure, the availability of the counter clerks and the language, the interactive terminal selects a counter corresponding to a local terminal, remotely transmits each image of a document to that local third-party terminal and orients the user to that local terminal.

During step 380, the interactive terminal transfers all the data concerning user identification, documents provided and procedures requested to a remote database for archiving and processing in view of future identification.

The terminal or server can thus record all or part of what was captured during the transaction with the user, including the documents, images and sounds captured, for:
  archiving and proof if required,
  real-time or post-session analysis by an operator, who can detect strange behavior,
  automatic analysis by the machine, which can detect "abnormal" behavior.

There now follows an example of the use of the present invention in the case of administrative formalities, it being understood that the present invention is not limited to that type of procedure but extends to any procedure between a user and a public or private organization. By means of the implementation of the present invention, a user, for example Mr. MartinMartin, goes directly to the interactive terminal on entering an administrative office, without waiting in the queue. He chooses "passport application", for example, and the interactive terminal asks him to place his documents in the scanner (for example current or expired identity card, passport application form or proof of residence). The camera takes images of Mr. MartinMartin's face and compares them with the identity photograph on the scanned identity card, and the interactive terminal asks Mr. MartinMartin to write his signature on a touch screen and compares this signature with the signature on the identity card, then asks Mr. Martin to provide his fingerprint and compares it with the one on the identity card. The terminal can then validate Mr. Martin's identity and automatically process the documents: identify them, verify their completeness and the consistency of the data which they contain, and read their contents.

The example above implements several steps for checking the user's identity. In other ways of implementing the present invention, the number and choice of identification steps carried out depends on both the performances of each type of step and the security level required. For example, if it concerns a transaction with no great risk attached, the identification will be faster but less reliable than for a transaction considered to be risky.

If a document is missing with regard to the administrative procedure requested or if a piece of information is missing from the documents, the terminal will request them from Mr. Martin and, in the case of unavailability, the procedure could be interrupted, with Mr. Martin having saved waiting time and the administrative body having avoided wasting time starting a procedure that could not have been completed.

At any time, Mr. Martin could ask for assistance by way of the interactive terminal and be helped by a virtual assistant to which he can ask questions in natural language. If he is not satisfied with the answers, Mr. Martin could then access a real assistant, by way of the interactive terminal and a videoconference with a remote assistant who will now have access to all the information provided by Mr. Martin and to the images of the documents.

In order to pay any user fees or taxes corresponding to the procedure, Mr. Martin could use his means of payment on the interactive terminal. When all these automatic procedures have been carried out, the interactive terminal will orient Mr. Martin to the counter best corresponding to his request (language, availability and procedure requested). The local terminal for the counter will then automatically receive all the information concerning Mr. Martin and the procedure requested, together with the images of the documents provided by Mr. Martin or by an administrative database. In addition, the terminal will receive a risk assessment of the identification of Mr. Martin or the authenticity of his documents, or an alert only in cases where this assessment represents a risk higher than a predetermined limit value. The clerk could then prepare his or her procedure or call upon other services not accessible to the public before even receiving Mr. Martin.

By means of the implementation of the present invention, Mr. Martin will have saved time and the administrative body will have done its work more reliably, more effectively and faster than it would have done without the terminal. In addition, it will have stored useful information for carrying out any future administrative procedures that Mr. Martin might request, and making them more secure.

FIG. 3 particularly concerns the carrying out of multiple procedures, based on at least one document, from a workstation at home or at the office. By means of this type of implementation of the present invention, a user can remotely perform administrative, fiscal, social and insurance procedures, providing documents, while giving the organizations which manage the corresponding procedures a level of security at least equal to that offered by a traditional clerk.

In addition, the device illustrated in FIG. 3 enables him or her to start a procedure from his or her home or office and, once the information and documents required have been validated, to continue the procedure by going to a branch of the organization concerned, and vice-versa.

FIG. 3 shows a workstation 400 linked, by means of a computer network 105, to local terminals 110 and 115 and a remote server 420 containing a remote database 122.

The workstation 400 includes:
  a means of capturing images of documents 425,
  a means of requesting complementary information 440,
  an image capture device for capturing a part of the user's body 460,
  a device for capturing the user's voice 490,
  a means of remote communication 500,
  a keyboard 515,
  a means of reading removable memory devices 530,
  a screen 535,
  a printer 545 and
  a speaker 550.

The workstation 400 takes the form of a computer of known type, for example a PC (personal computer) linked, by way of interfaces of known type, to the keyboard 515, computer network 105, means of capturing document images 425, device for capturing images of a part of the user's body 460, device for capturing the user's voice 490, means of reading removable memory 530 and screen 535.

In a manner known per se, the computer includes a central processing unit, a mass memory unit, for example a hard disk, containing the software applications implementing the various functions of the interactive workstation 400.

The keyboard 515 is of known type. In a variant, the keyboard 515 is replaced or complemented by a voice recognition software application associated to the device for capturing the user's voice 490 so that the user can interact verbally with the workstation 400. The computer network 105 is, for example, the Internet. It enables data to be transmitted between the interactive workstation 400, the local terminals 110 and 115 and the remote server 420, in accordance with known communication protocols.

The remote server 420 implements software applications for implementing the process covered by the present invention in cooperation with the workstation 400.

For example, preferably, the server 420 is equipped with software adapted to processing requests expressed in natural language by way of the keyboard and/or device for capturing the user's voice 490.

The means of capturing images of documents 425 is, for example, a scanner of known type, preferably flatbed, i.e. including a glass plate on which the user places the document whose image must be captured.

The device for capturing a part of the user's body 460 is an electronic camera containing a matrix based image capturing device, for example of CCD type (charge coupled device), for example in the form of a camera known as a "webcam". The device for capturing images 460 is, for example, adapted to capturing one or more images of the user's face.

The device for capturing the user's voice 490 is a microphone of known type. The means of reading removable memory 530 is adapted to reading a removable memory, for example a microchip card (smartcard), a "USB key", i.e. a device including a memory and an interface that can be plugged into a corresponding interface of the workstation 400, or an "SD" card or memory stick, a compact disk.

The means of processing images on the server 420 is adapted to providing, from the image of a document captured by the means of capturing images of documents 425, data representative of the type of document whose image was provided. To this effect, the means of processing images 122 detects the graphic elements that characterize the document, for example vertical or horizontal lines, bar codes and/or written words identifying the document, and compares these characteristics with those, stored in the local database 122, of all the types of documents learned during a learning phase or explicitly defined in the database. An example of a process that could be implemented by the means of processing images is described in document FR 07012, filed May 25, 2001, incorporated here for reference.

The means of processing images also provides data representative of the zones of the document in which the user has written and, preferably, of the significance of what has been written. It implements known techniques, for example optical character recognition (OCR).

In the case of a document including a photograph of the user, for example an identity card, the means of processing images detects this photograph (by analysis of grayscale or color levels and/or the gradients of these levels, which are generally locally lower than on the rest of the document), extracts it and stores it in a specific memory space.

In the case of a document including the user's signature, for example an identity card or application form, the means of processing images detects this signature (by analysis of oblique lines, intersections of lines and/or escribed geometric forms, these elements being indicators of a signature), extracts it and stores it in a specific memory space.

From these data, the means of processing images extracts at least one operating parameter and provides the user with information representative of data to be requested, in addition to the document.

To this effect, the means of processing images implements a database of procedures which, for each type of document, indicates the zones of the document that must be filled out, the complementary documents required, whether or not it is necessary to identify the user, and whether or not it is necessary for the user to make a payment The means of requesting complementary information 440 consists of the screen 535 and, possibly, the speaker 550 associated to a voice synthesis software application. It is adapted to indicating to the user the information and documents required for carrying out the procedure identified by the means of processing images (if there are several possible procedures, in function of the document, the means of requesting information asks the user which one he or she wishes to perform, if that question has not already been asked prior to the capture of the image of the document, and the user selects the chosen procedure from a menu).

The local database 122 stores information required for the operating of the interactive terminal 400, in particular the lists of documents and information required for administrative procedures and graphic data characteristic of documents.

The server 420 includes a means of checking the consistency between the different pieces of information extracted by the means of processing images adapted to verify that the significations of the words written by the user in the same document or in several documents are consistent.

The consistency check carried out by the means of checking consistency extends to checking the consistency between the contents of the documents scanned and those of the documents concerning the same user stored in a remote database or local memory medium. Possibly, the consistency check can be carried out with respect to threshold values corresponding to alert criteria of other organizations.

The server 420 includes a means of biometric analysis which is adapted to extracting biometric characteristics from the image of a part of the user's body and comparing them with characteristics extracted from a photograph of which an image has been captured by the means of capturing images of a document or from a remote database stored on the remote server 420 or a local memory medium (microchip, USB key, smart card, etc.)

As a variant, the means of biometric analysis can analyze the user's behavior, posture and/or the changes of expression on his or her face.

The server 420 includes a means of voiceprint analysis which is adapted to extracting characteristics of the user's voice from a voice capturing device 490 and comparing them with corresponding characteristics from a remote database stored on the remote server 420 or a local memory medium (microchip, USB key, smart card, etc.)

As a variant, the means of voiceprint analysis 495 analyzes voice changes in response to questions asked by a virtual or real assistant in order to detect indicators of doubt or lying.

Using the means of remote communication 500, for example a modem, the interactive workstation provides the remote server with the users identification characteristics determined by the means of analysis. The workstation can also record or transmit to the server all or part of what was captured during the transaction with the user, including the documents, images and sounds captured, for:

archiving and proof if required, real-time or post-session analysis by an operator, who can detect strange behavior, automatic analysis by the machine, which can detect "abnormal" behavior.

At any time, the user can request assistance using the user interface of the interactive workstation, for example by pressing a dedicated key or by a verbal request. In this case, the interactive workstation first displays a virtual assistant with a synthesized face which articulates the verbal messages transmitted by the speaker. If the user is not satisfied with this assistance, by way of the means of remote communication, the interactive workstation connects the user to a real remote assistant. This communication includes the transmission of all the images of documents that the user has provided together with his or her responses to the questions asked by the interactive workstation. The communication with the real assistant is both verbal and visual, each interlocutor seeing the image and hearing the voice of the other interlocutor.

Once all the required checks and exchanges of questions and answers have been carried out, in function of predetermined criteria, for example the specialized capacities or languages of the employees, the server 420 orients the user to one of the local terminals 110 and 115, i.e. to a visitor reception center containing that terminal, and, in parallel, transmits all the captured information to that terminal in order that the employee possesses all the information necessary for his or her work, before the user even arrives.

In the server 420, a means of risk assessment concerning the identification of the user and a means of risk assessment concerning the authenticity of a document provide an estimation of these risks, in function of the data captured by the workstation 400 or analyses carried out by the server 420. If one of these risks is higher than a predetermined value corresponding to that risk, an alert is recorded by the server 420 and transmitted to the local terminal in question, for example in the form of a display zone highlighted in red.

For example, the means of risk assessment concerning the identification of the user measures the discrepancies between the biometric characteristics, signature characteristics, fingerprint and/or voiceprint captured by the interactive workstation and the equivalent characteristics coming from the documents, the remote database or a local memory medium (microchip, USB key, smart card etc.), weights them in function of the reliability of each of these analyses (for example fingerprint analysis, which is currently considered to be very reliable, is given a higher weighting than signature analysis, which is considered to be less reliable) and determines a global risk assessment, for example the barycenter of the normalized differences with their respective weightings.

For example, the means of risk assessment concerning document authenticity measures the discrepancies between the background colors of the document (to detect local scratching) and the discrepancies between the graphological characteristics of what has been written by the user, measured by the means of analyzing graphological characteristics. As a variant, the user's handwriting can be used to authenticate the documents, by comparing graphological characteristics of the handwriting on the documents with corresponding graphological characteristics stored in a remote database or local memory medium.

FIG. 4 shows a series of functions successively implemented in specific ways of setting up the process and device covered by the present invention. FIG. 4 only represents one specific setup of functions, to which the present invention is not limited, numerous other setups being possible within the scope of the present invention.

Document image capture function 600 produces an image of a document provided by the user, for example by implementation of a scanner. Function 605 extracts structural characteristics of the document (dimensions, lines and geometric forms, colors, presence of a document identifier, title included in the document, etc.) Function 610 compares these characteristics with characteristics of documents stored in a database of documents associated to procedures for determining which procedure(s) is(are) associated to the type of document characterized by function 605. In the case where several procedures are identified, the user can be asked which procedure he or she wishes to be carried out. In possible variants, the user is asked which procedure he or she wishes to carry out before presenting the first document, the procedure carried out by function 610 being determined from a subset of procedures defined in function of the user's responses.

Function 615 queries a database of information and/or complementary documents required for procedures in order to determine all the information required for the procedure identified by function 610. These types of required information include:

information that should be added to the document of which an image has already been captured, information that should be added to the required complementary document(s) to be requested from the user, information to be found in available databases concerning users and/or procedures, information which should be on the user's removable data storage medium, and information that must be requested from the user.

Note that some of this information can be found in several or all these subsets of information, sometimes with different contents. For example, the address on an identity card may be obsolete, the user having moved house since the identity card was issued.

Note that function 615 preferentially considers, in an iterative manner, the contents of each document, piece of complementary information or portable electronic data storage medium provided by the user, in order to determine the complementary information required.

Thus, for example, in the case of an income declaration, according to the boxes checked and amounts entered by the user on a paper declaration form, function 615 determines the documentary proof required, in an iterative manner.

The pieces of complementary information to be requested from the user are thus ordered in such a way that the order in which they are obtained enables the updating of the remaining complementary information to be requested from the user.

Preferentially, function 615 also selects a vocabulary associated with the identified procedure, and with the documents implemented during that procedure. This vocabulary is used by function 625, which is described below.

Function 620 asks the user to place at least one required document in a means of capturing images, for example a scanner, and controls the means of capturing images in order to capture an image of each complementary document requested.

Function 625 extracts information from each image of a document provided by the user, including the first document provided, in order to obtain the information required for carrying out the procedure, for checking the sufficiency and consistency of the information collected, and for assessing the risk concerning the authenticity or falsification of a document or user identity. Each piece of information extracted is associated to an identifier linked to the position of the extracted information in the document, the significance of which is recorded in the database of documents, and to a piece of printed writing situated with regard to the position where this extracted information was read or to its content by reference to explicit, implicit or statistical rules concerning the significance of that content.

In particular, for each complementary document, function 625 implements functions 605 and 610 to determine the type of each complementary document and verify that it really is the type of complementary document requested from the user.

Function 630 extracts, from databases of available information concerning users and procedures, complementary information required for the procedure. For example, this complementary information includes checking that the documents provided or requested and/or the portable electronic information media have not been stolen or lost, characteristics of the user's handwriting or signature, procedures already carried out by the user, and durations of validity of procedures, documents or portable electronic information media.

Function 635 requests from the user complementary information to be entered, manually or vocally (by saying it) and/or at least one portable electronic information medium, for example a social security or payment microchip card.

Function 640 collects the information provided by functions 625, 630 and 635 and checks the sufficiency of this information with respect to the information required for performing the requested procedure. For example, if a document has not been correctly filled out, or if a document or portable electronic information medium is out-of-date, function 640 indicates this insufficiency to the user so that he or she can correct the situation by returning to functions 600, 620 and/or 635, respectively.

Function 640 also carries out a consistency check of the information collected, compares the information of the same type collected and indicates any inconsistencies to the user, it being understood that the consistency of certain types of information, the content of which varies during the user's life (for example his or her address or identity card number) is not indispensable for performing certain procedures.

Finally, function 640 estimates the risk regarding the authenticity of the document(s) of which an image has been captured, for example in function of characteristics of the user's handwriting or signature, if these characteristics have been provided by two different documents or by at least one document together with function 630.

Function 645 captures biometric, behavioral, vocal, signature and/or handwriting data from the user, as shown in FIGS. 1 to 3. Function 650 estimates the risk concerning the user's identity, as shown in FIGS. 1 to 3.

Function 650 indicates to the user whether the requested procedure can be processed and transmits the information collected, images captured, recording of the session of interaction with the user and estimated risks to an automatic or manual processing center for the requested procedure or to a counter with a computer terminal to which the user is directed. Note that this information can be fed into the database implemented by function 630.

The invention claimed is:

1. A device for processing documents, that comprises:
   means for selecting one procedure from among multiple procedures, comprising
   means for capturing an image of a document, and
   means for processing images captured by the means for capturing an image, adapted to recognize one type of document from among multiple types of documents, to extract information from at least one document image captured by the means for capturing an image, the means for processing images being adapted to verify that each document of which an image has been captured by the means for capturing an image includes all information required for the procedure and, in a case of a lack of required information, to transmitting to means for requesting information, each piece of the information missing from the document;
   means for identifying adapted to identify a procedure to which the document corresponds and to identify at least one complementary document needed, in addition to the document of which the image has been captured, to perform the procedure;
   means for requesting from a user each complementary document identified by the means for identifying adapted to command the means for capturing an image to capture an image of each complementary document requested;
   means for comparing information of a same type extracted from images of different documents in order to verify how the different documents correspond; and
   means for requesting complementary information being adapted to indicate a lack of correspondence between information of the same type extracted from images of different documents.

2. The device according to claim 1, wherein the means for identifying is adapted to identify, in a database, complementary information needed, in addition to the documents, to perform the procedure.

3. The device according to claim 2, wherein the means for requesting complementary information is adapted to request that the user enter at least one piece of complementary information and to command means for data entry, whether manual or vocal, by the user, of complementary information.

4. The device according to claim 1, wherein the means for requesting complementary information is adapted to request at least a provision of a portable electronic information medium and to command means for communication with the portable electronic information medium.

5. The device according to claim 1, further comprising means for searching for complementary information, in a database, adapted to search, in the database, for at least one piece of complementary information identified by the means for identifying.

6. The device according to claim 5, further comprising means for comparing at least one piece of complementary information provided by the user in response to the request for complementary information made by the means for requesting complementary information with at least one piece of complementary information of the same type provided by means for searching for complementary information, the means for requesting information being adapted to indicating any lack of correspondence between at least one piece of complementary information provided by the user and one piece of complementary information of a same type provided by the means for searching for complementary information.

7. The device according to claim 1, further comprising a device for capturing an image of a part of the user's body and means for biometric analysis adapted to compare the image of a part of the user's body with an image of a photograph of the user on a document of which an image has been captured by the means for capturing images.

8. The device according to claim 1, that further comprises a device for capturing an image of a part of the user's body and means for biometric analysis adapted to compare the image of a part of the user's body with biometric data concerning the user stored in a remote database or a local memory medium.

9. The device according to claim 1, that further comprises means for capturing the user's handwriting or signature written on a surface of the means for capturing handwriting or signatures, and means for analyzing handwriting or signatures adapted to compare the handwriting or signature with an image of the user's handwriting or signature on a document of which an image has been captured by the means for capturing images.

10. The device according to claim 1, that further comprises means for capturing the user's handwriting or signature written on a surface of the means for capturing handwriting or signatures, and means for analyzing the movements of writing or signing adapted to comparing the movements with information concerning the movements of the user when writing or signing stored in a remote database or portable electronic information medium.

11. The device according to claim 1, that further comprises a device for capturing the user's voice and means for voiceprint analysis adapted to compare the user's voiceprint with voiceprint data concerning the user stored in a remote database or a local memory medium.

12. The device according to claim 1, that further comprises means for remote transmission of document images to a third-party terminal and means for orienting the user to the third-party terminal.

13. The device in according to claim 1, that further comprises means for risk assessment concerning the authenticity of a document and means for alerting adapted to indicate at least one case of a risk assessment greater than a predetermined value.

14. The device according to claim 1, that further comprises means for risk assessment concerning the identification of the user and means for alerting adapted to indicating at least one case of a risk assessment greater than a predetermined value.

15. The device according to claim 1, that further comprises means for analysis of the user's physical behavior.

16. The device according to claim 1, that further comprises means for communication with a tele-advisor and means for transferring, to the tele-advisor, information provided by the user.

17. The device according to claim 1, that further comprises means for generating a virtual assistant, means for displaying a synthesized image of that virtual assistant and means for diffusing a synthesized voice of that virtual assistant.

* * * * *